(12) United States Patent
Kusari

(10) Patent No.: US 10,916,014 B2
(45) Date of Patent: Feb. 9, 2021

(54) DISTINGUISHING VIRTUAL OBJECTS FROM ONE ANOTHER

(71) Applicant: Ford Global Technologies, LLC, Dearborn, MI (US)

(72) Inventor: Arpan Kusari, East Lansing, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 142 days.

(21) Appl. No.: 15/995,956

(22) Filed: Jun. 1, 2018

(65) Prior Publication Data

US 2019/0370975 A1 Dec. 5, 2019

(51) Int. Cl.
| G06K 9/00 | (2006.01) |
| G06T 7/136 | (2017.01) |
| G06F 16/583 | (2019.01) |

(52) U.S. Cl.
CPC .......... *G06T 7/136* (2017.01); *G06F 16/5838* (2019.01); *G06K 9/00805* (2013.01); *G06K 9/00825* (2013.01); *G06T 2207/10028* (2013.01)

(58) Field of Classification Search
CPC ............ G06K 9/00805; G06K 9/00825; G06T 2207/10028; G06T 7/136; G06F 16/5838; G06F 17/3025
See application file for complete search history.

(56) References Cited

U.S. PATENT DOCUMENTS

| 9,436,702 B2 | 9/2016 | Pryakhin et al. |
| 9,846,946 B2 | 12/2017 | Fan et al. |
| 10,210,382 B2 * | 2/2019 | Shotton .................. G06F 3/017 |
| 2016/0146604 A1 * | 5/2016 | Metzler ................. G01C 15/00 33/228 |
| 2016/0379083 A1 * | 12/2016 | Sala ......................... G06K 9/52 345/633 |
| 2018/0284257 A1 * | 10/2018 | Sutou ...................... G01S 13/93 |
| 2019/0340775 A1 * | 11/2019 | Lee ....................... G01S 17/931 |

FOREIGN PATENT DOCUMENTS

| CN | 106204705 A | 12/2016 |
| CN | 106530380 A | 3/2017 |
| CN | 104239551 B | 4/2017 |

(Continued)

OTHER PUBLICATIONS

Yadav, et. al., "Pole-Shaped Object Detection Using Mobile LIDAR Data in Rural Road Environments", ISPRS Annals of the Photogrammetry, Remote Sensing and Spatial Information Sciences, vol. II-3/W5, 2015, ISPRS Geospatial Week 2015, Sep. 28-Oct. 3, 2015, La Grande Motte, France (6 pages).

(Continued)

*Primary Examiner* — Tom Y Lu

(74) *Attorney, Agent, or Firm* — Frank A. MacKenzie; Bejin Bieneman PLC

(57) ABSTRACT

A system includes a processor and memory storing instructions executable by the processor. The instructions include determining whether a currently-evaluated point is part of a segment. This may include: determining feature vectors for the currently-evaluated point and for each of a plurality of previously-evaluated points tagged to the segment; using the feature vectors to determine a probability score; and determine whether the score is greater than a threshold.

18 Claims, 7 Drawing Sheets

(56) References Cited

FOREIGN PATENT DOCUMENTS

| CN | 106815847 A | 6/2017 |
|---|---|---|
| CN | 107239794 A | 10/2017 |

OTHER PUBLICATIONS

Niemeyer, et. al., "Conditional Random Fields for LIDAR Point Cloud Classification in Complex Urban Areas", ISPRS Annals of the Photogrammetry, Remote Sensing and Spatial Information Sciences, vol. I-3, 2012, XXII ISPRS Congress, Aug. 25-Sep. 1, 2012, Melbourne, Australia (6 pages).

\* cited by examiner

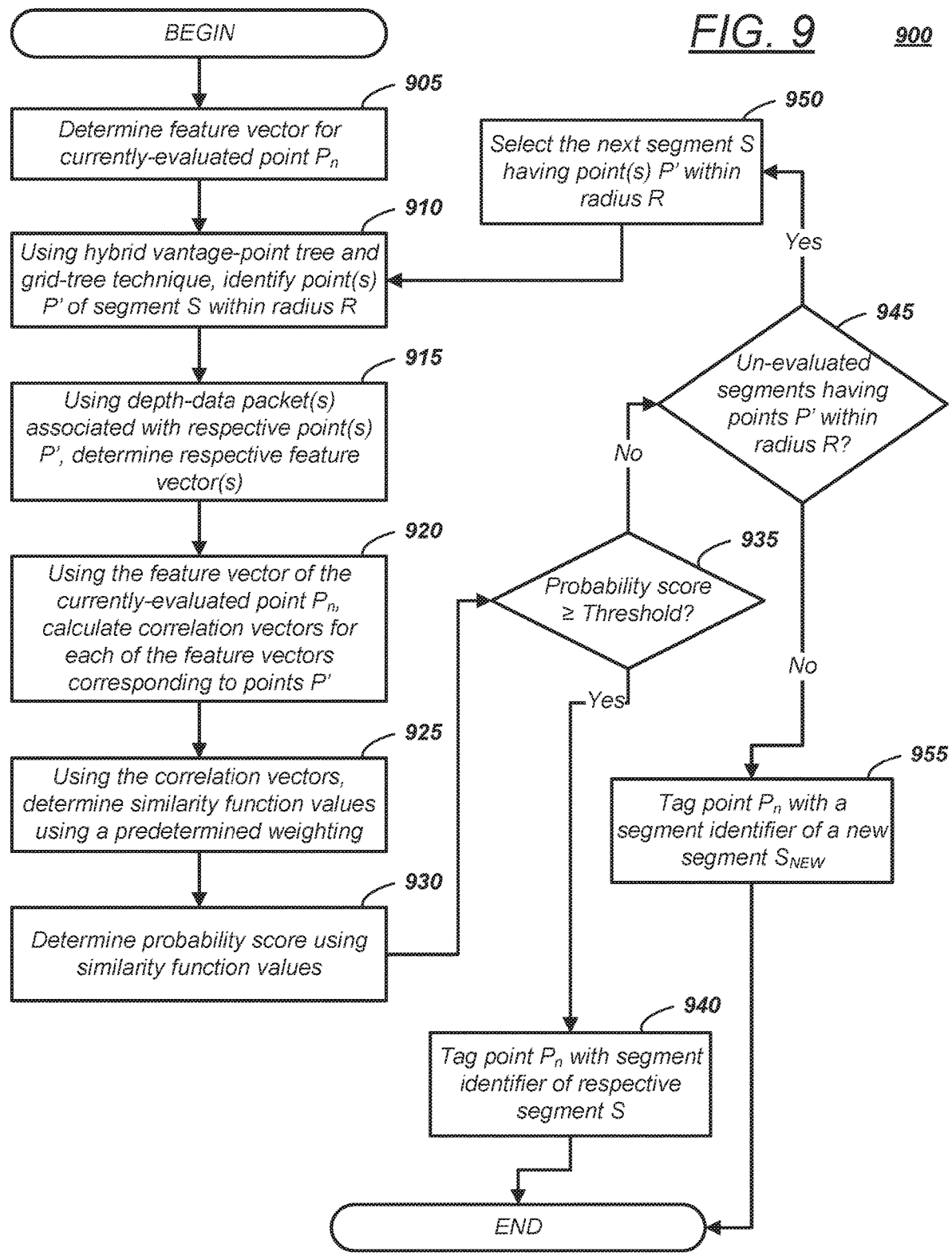

DISTINGUISHING VIRTUAL OBJECTS FROM ONE ANOTHER

BACKGROUND

Various techniques exist for organizing point-cloud data obtained from light detection and ranging (LIDAR) devices. An objective of organizing this point-cloud data may be to identify objects within the field of view of the LIDAR device. One problem that may arise is distinguishing one object from another, particularly when the objects are spatially close to one another.

BRIEF DESCRIPTION OF THE DRAWINGS

FIG. 9 illustrates a flowchart of a process for disambiguating one virtual surface from another.

DETAILED DESCRIPTION

Figure 1:
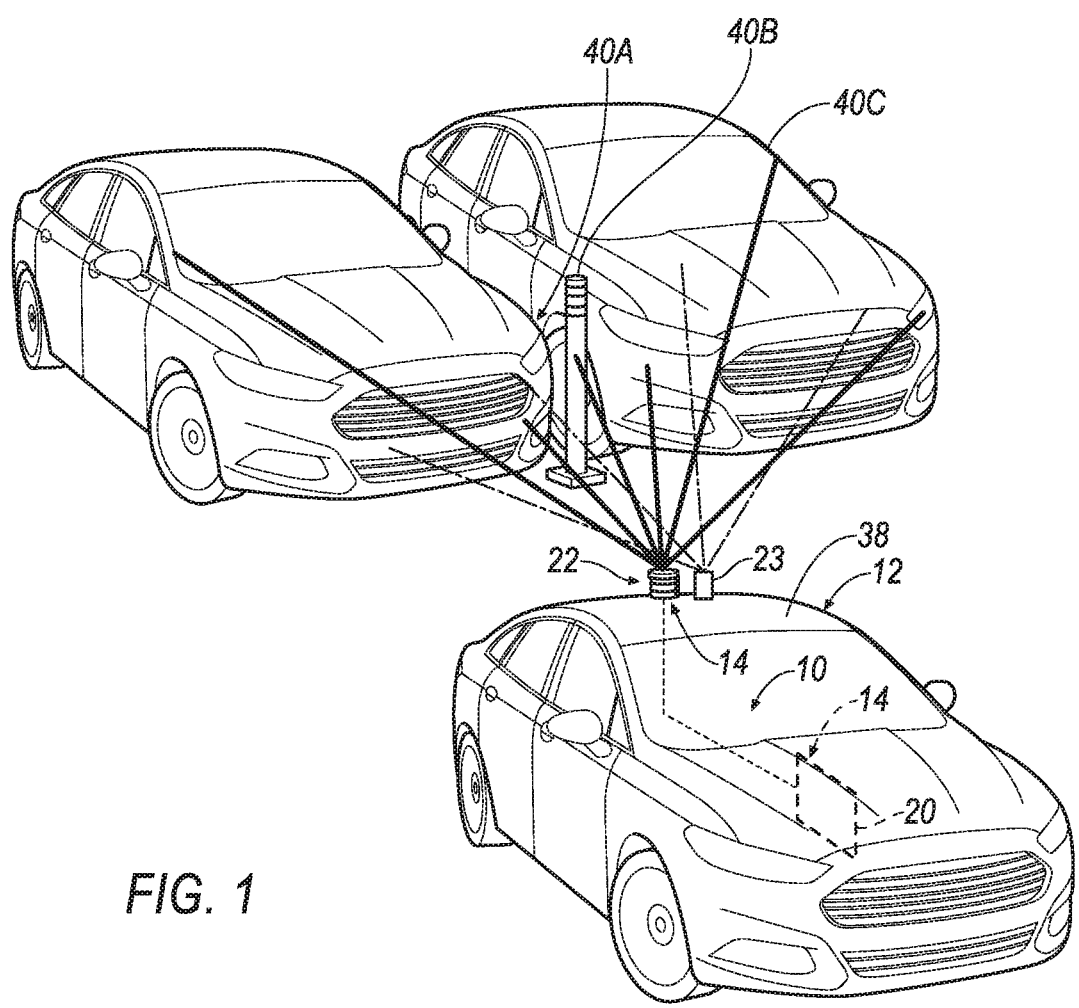
FIG. 1 is a perspective view of a vehicle having an imaging system including a light detection and ranging (LIDAR) device.

A system is described that determines whether a point of point-cloud data should be tagged with one or more existing segment identifiers, or whether a new segment should be created that includes the evaluated point. According to one example, a method comprises: determining that a currently-evaluated point $P_n$ is part of a segment by: determining feature vectors for point $P_n$ and for each of a plurality of previously-evaluated points P' tagged to the segment; using the feature vectors, determine a probability score; and determine that the score is greater than a threshold.

According to at least one example, the feature vector for point $P_n$ comprises: a planarity parameter, an anisotropy parameter, a sphericity parameter, or a combination thereof.

According to at least one example, the feature vector for point $P_n$ further comprises at least one of: a red-value parameter, a green-value parameter, a blue-value parameter, or an intensity parameter.

According to at least one example, the planarity, anisotropy, and sphericity parameters are calculated using a surface normal vector having an origin at point $P_n$.

According to at least one example, the points P' are within a predetermined radius of point $P_n$.

According to at least one example, the points P' are stored in memory, and further comprising: looking up the points P' using a grid-tree structure.

According to at least one example, the method further comprises: prior to determining the score, calculating a correlation vector $\mu_x$ for each of the respective feature vectors of points P' by determining a difference between the feature vector of point $P_n$ [$h_p$( )] and the respective feature vectors of points P' [$h_{p'(x)}$( )].

According to at least one example, the method further comprises: calculating a similarity function value $f_x(P_n, P')$ using each of the respective feature vectors associated with points P' [$h_{p'(x)}$( )].

According to at least one example, the method further comprises: calculating the score using an exponential of a negative summation of each of the similarity function values $f_x(P_n, P')$.

According to at least one example, the feature vectors comprise feature vector parameters derived from a light detection and ranging device data.

According to at least one example, the parameters further are derived using color data, intensity data, or both.

According to another example, a system is described that comprises: memory storing instructions; and a processor executing the instructions comprising, to: determine feature vectors for a currently-evaluated point $P_n$ and for each of a plurality of previously-evaluated points P' tagged to a segment S1; using the feature vectors, determine a probability score; and when the score is greater than a threshold, tag point $P_n$ to segment S1.

According to at least one example, the points P' are within a predetermined radius of point $P_n$.

According to at least one example, the points P' are stored in memory, and the instructions further comprising, to: look up the points P' using a grid-tree structure.

According to at least one example, the system further comprises instructions to: prior to determining the score, calculate a correlation vector $\mu_x$ for each of the respective feature vectors of points P' by determining a difference between the feature vector of point $P_n$ [$h_p$( )] and the respective feature vectors of points P' [$h_{p'(x)}$( )].

According to at least one example, the system further comprises instructions to: calculate a similarity function value $f_x(P_n, P')$ using each of the respective feature vectors associated with points P' [$h_{p'(x)}$( )].

According to at least one example, the system further comprises instructions to: calculate the score using an exponential of a negative summation of each of the similarity function values $f_x(P_n, P')$.

According to at least one example, the system further comprises instructions to: determine feature vectors for each of a plurality of previously-evaluated points P' tagged to a segment S2; using the feature vector of point $P_n$ and the feature vectors of previously-evaluated points P' tagged to the segment S2, determine a second probability score; and when the second probability score is greater than the threshold, tag point $P_n$ to segment S2.

According to at least one example, the feature vectors comprise feature vector parameters derived from color data, intensity data, a surface normal vector at point $P_n$, or a combination thereof.

According to another example, a system comprises: memory storing instructions; and a processor executing the instructions comprising, to: determine feature vectors for a currently-evaluated point $P_n$ and for all previously-evaluated points P' within a predetermined radius of point $P_n$; using the feature vectors, calculate one or more probability scores that are less than a threshold; and based on the calculation, identify a new segment and tag point $P_n$ to the new segment.

According to the at least one example, a computer is disclosed that is programmed to execute any combination of the method examples set forth above.

According to the at least one example, a computer program product is disclosed that includes a computer readable medium storing instructions executable by a computer processor, wherein the instructions include any combination of the instruction or method examples set forth above.

Exemplary System Elements

Turning now to the figures wherein like reference numerals denote like or similar elements, features or functions, an autonomous driving system 10 for a vehicle 12 is shown. The autonomous driving system 10 may include an imaging system 14 that comprises a computer 20, at least one depth-detection device 22 (e.g., such as a light detection and ranging (LIDAR) device, radar, etc.), and optionally an imaging device 23 (e.g., such as a digital camera or the like). More particularly, computer 20 may receive a point-cloud data set from the depth-detection device 22 and may parse and sort this data set so that vehicle 12 may determine situational awareness and be capable of navigating in an autonomous driving mode. More particularly, according to a process commonly referred to as segmentation, computer 20 may analyze and organize this point-cloud data (scanned by the device 22) into virtual objects representative of physical or actual objects in the real world (e.g., around vehicle 12). According to one technique described herein, computer 20 may execute instructions that utilize both a vantage-point tree data structure and a grid-tree data structure in order to reconstruct the virtual object(s). Using this hybrid vantage-point tree/grid-tree approach, computer 20 may be able to reconstruct the virtual object faster and more efficiently than by using only a grid-tree data structure, only a vantage-point tree (or metric) data structure, or only some other data structure.

During the reconstruction, so called over-segmentation may occur when the computer 20 inadvertently merges two or more distinct virtual objects (or portions thereof) into a single virtual object. For example, as illustrated in FIG. 1, if over-segmentation occurs, computer 20 may consider the virtual objects that correspond to a vehicle 40A, a post 40B, and/or a vehicle 40C to be a single virtual object. In at least one example, computer 20 may disambiguate physical object 40A from physical objects 40B and/or 40C first by determining a surface normal vector relative to a point of the point-cloud data and then, using the surface normal vector, determining a feature vector comprising of one or more feature vector parameters (e.g., such as a planarity parameter, an anisotropy parameter, a sphericity parameter, etc.). This will be described in greater detail below.

As also described more below, in at least one example, the feature vector may include—alternatively or additionally—other feature vector parameters in order to disambiguate one virtual object from another (e.g., a red-value parameter, a green-value parameter, a blue-value parameter, an intensity parameter, etc.). These parameters may be determined using data received from depth-detection device 22, from data received from imaging device 23, or from a combination thereof. Thus, as used herein, a feature vector $h_p()$ is a vector pertaining to a surface characteristic of the physical object and it is comprised of and defined by feature vector parameters. And as used herein, a feature vector parameter refers to an indexed element of the feature vector that comprises a measurement relative to the surface of the physical object, wherein, when computer 20 evaluates the feature vector relative to one or more other feature vectors, computer 20 is capable of distinguishing a physical surface (corresponding to one virtual object) from another physical surface (corresponding to a different virtual object), thereby minimizing over-segmentation. Further, the examples of feature vector parameters listed above are not exhaustive (i.e., examples other than a planarity parameter, an anisotropy parameter, a sphericity parameter, a red-value parameter, a green-value parameter, a blue-value parameter, and/or an intensity parameter may exist).

Thus, as discussed below, any suitable combination of the feature vector parameters may be calculated by computer 20, and the feature vectors comprised thereby may be used to disambiguate one virtual object from another and thereby avoid over-segmentation. As used herein, over-segmentation means merging at least a first segment (of a first virtual object) with at least a second segment (of a second virtual object), wherein the first virtual object corresponds with a first physical object (e.g., in the real world) and the second virtual object corresponds with a second physical object (e.g., in the real world), wherein the first and second physical objects are two different physical objects, wherein merging the segments means combining the segments into a single segment (i.e., merging the segments into at least part of a single virtual object). For example, the first segment and the second segment each may be within a predetermined proximity of a currently-evaluated elevation point (e.g., indicating to a LIDAR computer to merge the segments together). Thus, by way of example only, over-segmentation could include merging a first segment (e.g., representative of a first vehicle) with a second segment (e.g., representative of a second vehicle). Accordingly, in over-segmentation, the computer 20 may view the first and second vehicles as a single virtual object when, in fact, they are two different physical objects. It should readily be appreciated that in at least the autonomous vehicle context, were vehicle 12 to construe objects 40A, 40C to be a single physical object in the real world while operating in an autonomous driving mode, the computer 20 accordingly may make decisions that result in a vehicle-to-vehicle collision or the like. Thus, minimizing over-segmentation is desirable.

A description of how computer 20 calculates and uses feature vectors follows an exemplary description of the autonomous driving system 10 and one or more methods of using the system 10 and/or system 14.

FIG. 1 illustrates vehicle 12 as a passenger vehicle; however, vehicle 12 could be any other suitable vehicle type, including a truck, a sports utility vehicle (SUV), a recreational vehicle, a bus, aircraft, marine vessel, or the like that comprises the autonomous driving system 10 and/or imaging system 14. System 10 may facilitate operation of the vehicle 12 in one or more autonomous modes, as defined by the Society of Automotive Engineers (SAE) (which has defined autonomous vehicle operation at levels 0-5). More particularly (and as described in greater detail below), system 10 may comprise one or more onboard computers configured to store and execute logic instructions or sets of instructions embodied in hardware, software, firmware, a combination thereof, or the like to thereby enable vehicle 12 to operate with some user assistance (partial autonomy) or without any user assistance (full autonomy). For example, at levels 0-2, a human driver monitors or controls the majority of the driving tasks, often with no help from the vehicle 12. For example, at level 0 ("no automation"), a human driver is responsible for all vehicle operations. At level 1 ("driver assistance"), vehicle 12 sometimes assists with steering, acceleration, or braking, but the driver is still responsible for the vast majority of the vehicle control. At level 2 ("partial automation"), vehicle 12 can control steering, acceleration, and braking under certain circumstances without human interaction. At levels 3-5, vehicle 12 assumes more driving-related tasks. At level 3 ("conditional automation"), vehicle 12 can handle steering, acceleration, and braking under certain circumstances, as well as monitoring of the driving environment. Level 3 may require the driver to intervene occasionally, however. At level 4 ("high automation"), vehicle 12 can handle the same tasks as at level 3 but without relying on the driver to intervene in certain driving modes. At level 5 ("full automation"), vehicle 12 can handle all tasks without any driver intervention.

In at least one example, the one or more computers of autonomous driving system 10 of vehicle 12 each may have at least one processor and/or memory, wherein the respective processor(s) execute instructions stored in respective memories that facilitate driving the vehicle 12 in one or more of the autonomous modes described above. Computer 20 may store and execute these autonomous driving instructions; however, in other examples, computer(s) (not shown) may store and execute such autonomous driving instructions (e.g., computer 20 could be dedicated to imaging system 14). According to at least one example, using system 10, vehicle 12 is operational according to SAE levels 3, 4, and/or 5; and in at least one example, the autonomous driving system 10 facilitates operation of vehicle 12 at fully autonomy (e.g., level 5).

Turning now to imaging system 14, the system 14 may comprise any components adapted to receive depth and/or image data and analyze, sort, aggregate, and/or utilize such data. As described above, system 14 comprises at least one computer (e.g., computer 20), at least one depth-detection device 22, and an optional imaging device 23. Computer 20 may be dedicated to depth- and image-processing tasks; in other examples, computer 20 may be shared with other vehicle functions or configured, programmed, etc. to carry out other tasks.

Figure 2:
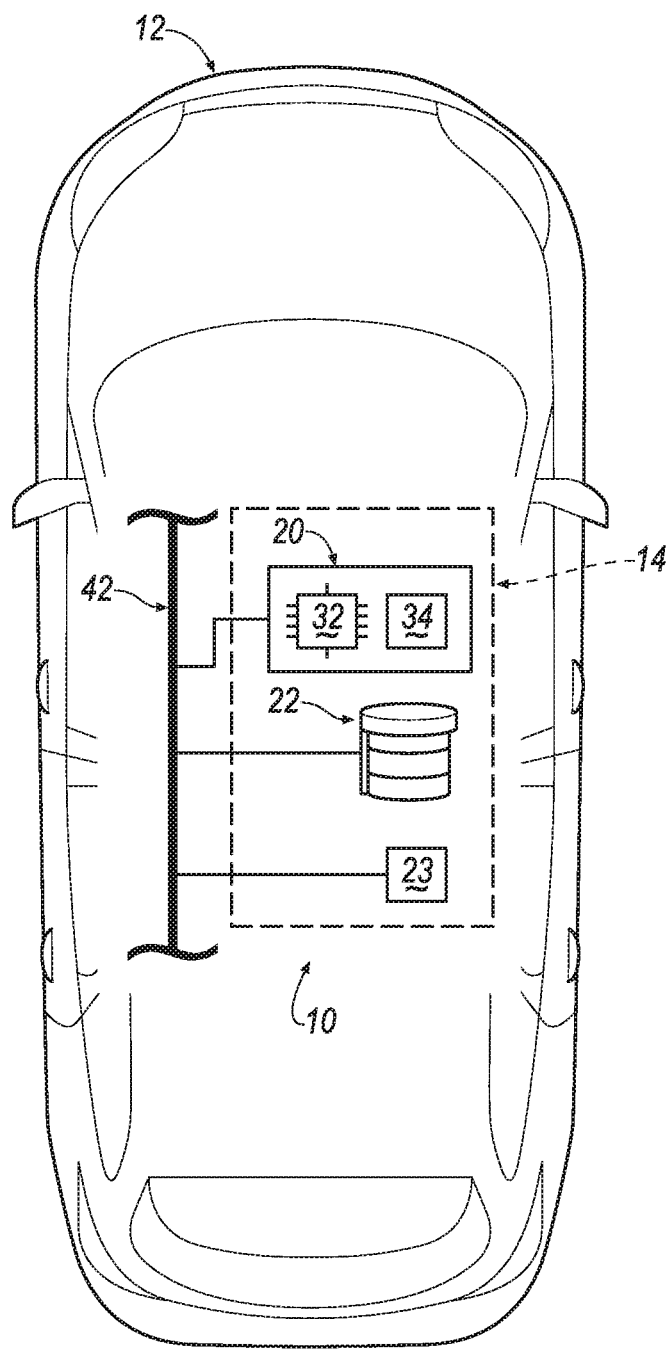
FIG. 2 is a schematic diagram of some exemplary components of the imaging system.

As shown in FIG. 2, computer 20 may comprise at least one processor 32 (one is shown) and memory 34. Processor 32 may be programmed to process and/or execute digital instructions to carry out at least some of the tasks described herein. Non-limiting examples of processor 32 include a microprocessor, a microcontroller or controller, an application specific integrated circuit (ASIC), a field-programmable gate array (FPGA), etc.—just to name a few. A non-limiting example of digitally-stored instructions—storable in memory 34 and executable by processor 32—includes, to: determine that a currently-evaluated point $P_n$ is part of a segment by: determining feature vectors for point $P_n$ and for each of a plurality of previously-evaluated points P' tagged to the segment; using the feature vectors, determine a probability score; and determine that the score is greater than a threshold. Other examples of instructions which may be used instead of and/or in addition to these examples, as well as sequences of instructions, are described in the one or more processes below.

Memory 34 may include any non-transitory computer usable or readable medium, which may include one or more storage devices or articles. Exemplary non-transitory computer usable storage devices include conventional hard disk, solid-state memory, random-access memory (RAM), read-only memory (ROM), erasable programmable read-only memory (EPROM), electrically erasable programmable read-only memory (EEPROM), as well as any other volatile or non-volatile media. Non-volatile media include, for example, optical or magnetic disks and other persistent memory, and volatile media, for example, also may include dynamic random-access memory (DRAM). These storage devices are non-limiting examples; e.g., other forms of computer-readable media exist and include magnetic media, compact disc ROM (CD-ROMs), digital video disc (DVDs), other optical media, any suitable memory chip or cartridge, or any other medium from which a computer can read. As discussed above, memory 34 may store one or more computer program products which may be embodied as software, firmware, or other programming instructions executable by the processor 32.

The one or more depth-detection devices 22 (e.g., one is shown) may comprise any suitable electronic device configured to receive ranging measurements (e.g., a range or distance between device 22 and a physical object (e.g., such as 40A, 40B, 40C) within the device's line-of-sight (LOS)). Further, device 22 provides such measurements to computer 20 for analysis—e.g., namely, so that vehicle 12 can identify the shape, position and nature of the physical object and thereafter navigate around or relative to said physical object. Of course, device 22 concurrently may provide depth data for numerous physical objects relative to vehicle 12 (e.g., not just the several objects shown in FIG. 1).

In some examples, device 22 may execute pre-processing of point-cloud or other sensor data—and then provide it to computer 20. In other examples, no pre-processing occurs, and so-called raw data is provided to computer 20. In the discussion that follows, device 22 is described as a light detection and ranging (LIDAR) device which provides point-cloud data; however, it should be appreciated that this is merely one example. Radar and other depth-detecting devices could be used instead; similarly, data other than point-cloud data could be presented to computer 20.

LIDAR device 22 may be positioned in any suitable location on vehicle 12; e.g., in FIG. 1, the LIDAR device 22 is shown atop a roof 38; this is an example (e.g., non-limiting examples of other locations include the A-pillars, a rear vehicle door, a vehicle grill, etc.). LIDAR device 22 may scan a region around vehicle 12 and detect physical objects 40A, 40B, 40C within a line-of-sight (LOS) of vehicle 12. LIDAR device 22 may scan any suitable physical object having two- or three-dimensional physical properties (e.g., from the point-of-view of the device 22). As will be appreciated by skilled artisans, in the LIDAR example, device 22 receives reflectance data having relatively high-depth resolution (e.g., when compared to other commercially-available alternatives); depth data received by a LIDAR device is also referred to herein as point-cloud data. And as referred to herein, a collection of this point-cloud data is a point-cloud data set. Further, each point of the point-cloud data is referred to herein as an elevation point. Each elevation point may be categorized by the computer 20 into a depth-data packet, and as described more below, may include relative coordinate parameters, a timestamp, and/or other data. Coordinate parameters may be defined by a spherical coordinate system, a Cartesian coordinate system, or the like. LIDAR device components and construction, point-cloud data received from a LIDAR device, and LIDAR scanning techniques will not be described in greater detail, as these aspects and techniques will be appreciated by skilled artisans.

Turning now to the imaging device 23 shown in FIGS. 1 and 2, one or more imaging devices 23 may comprise any suitable light-sensitive device for capturing red-green-blue (RGB) data and/or intensity data. Non-limiting examples of imaging devices 23 include cameras (e.g., such as complementary metal oxide semiconductor (CMOS) devices and charge-coupled devices (CCDs)), as well as image intensifiers, and the like, just to name a few examples. In at least one example, imaging device 23 may receive the color data and/or intensity data at each of a plurality of pixels. Accordingly, it will be appreciated that computer 20 may use RGB data and intensity data to determine for each pixel a red-value parameter, a green-value parameter, a blue-value parameter, and/or an intensity parameter (which may form part of the feature vector, as described below).

In many instances, the depth-detection device 22 and imaging device 23 are aligned to view a common physical object (e.g., such as one or more of 40A, 40B, 40C). Further, the devices 22, 23 may be calibrated to one another so that data provided at each pixel is associated with corresponding elevation point of the point-cloud data (e.g., correlated in time—e.g., according to a function such as ƒ(depth data, image data, time)). In some examples, computer 20 may be programmed to execute such a calibration, or another computer onboard vehicle 12 may perform the calibration—e.g., either according to techniques known in the art. Calibration may account for deviations in physical (or so-called mounting) alignment of device 22 relative to device 23, as well as other factors (e.g., such as corresponding fields of view, parallax, etc.). As used herein, calibration refers to a corrective mapping procedure, wherein, where available, each elevation point of depth data (e.g., from LIDAR device 22) is mapped to a corresponding pixel or the like from imaging device 23. In this manner, either the depth data or the image data may be used by computer 20 to determine feature vectors relative to the virtual object determined thereby.

As shown in FIG. 2, computer 20, LIDAR device 22, and optional imaging device 23 may be configured for wired and/or wireless electronic communication via a network connection 42. Network connection 42 may include one or more of a controller area network (CAN) bus, Ethernet, Local Interconnect Network (LIN), a fiber optic connection, or the like—just to name a few non-limiting examples. According to one example, which may be used alternatively or in combination with the illustrated bus example, connection 42 comprises one or more discrete wired or wireless connections.

Now turning to a process describing how data received from the depth-detection device 22 and/or the image device 23 may be used to disambiguate one virtual surface from another. The explanation which follows first refers to how the computer 20 receives and organizes depth data (e.g., from device 22). Thereafter, the process describes how the computer 20 receives and uses image data (e.g., from device 23). The process also describes how the depth data, the image data, or both is used to determine feature vector(s). And finally, the process describes how the feature vectors are used to disambiguate whether an elevation point of point-cloud data belongs to one of two (or more) virtual objects. In an autonomous vehicle environment—e.g., to cite one example—this process may be iterative, as the computer 20 may repeatedly receive new depth and image data and may repeatedly tag the elevation point to its appropriate virtual object; this is because, in at least this context, physical objects proximate to vehicle 12 often may move relative to the vehicle 12.

In at least one example, computer 20 may determine for each elevation point (of depth data) whether the current elevation point is within a predetermined distance from previously-evaluated elevation points (using a vantage-point tree data structure implemented using instructions executable by computer 20). As used herein, a currently-evaluated elevation point is an elevation point currently being evaluated by computer 20 for the purpose of segmentation and/or determining or resolving a virtual object. And as used herein, a previously-evaluated elevation point is an elevation point previously, similarly resolved with respect to the virtual object. Further, computer 20 may store in memory 34 at least some of the previously-evaluated elevation points, and computer 20 may determine whether the currently-evaluated elevation point is within the predetermined distance of other previously-evaluated elevation points (using a grid-tree data structure implemented using instructions executable by computer 20). For example, as explained below, a grid-tree data structure may include a hash map of depth data (e.g., which depth data comprises one or more depth-data packets). Each depth-data packet may be an object data structure, and as used herein, a depth-data packet comprises coordinate parameters of at least one elevation point, a segment identifier which identifies a segment of a respective virtual object, and a feature vector $h_p$(first parameter, second parameter, . . . ). As used herein, a segment comprises a single elevation point or an aggregation of evaluated elevation points which are arranged as at least a portion of a common virtual object. Put differently, in some instances, a plurality of aggregated segments may comprise the virtual object. Further, as used herein and as described more below, when a point (e.g., of point-cloud data) is described as being 'tagged' with the segment identifier, it means that the segment identifier is included in (or updated in) the depth-data packet.

FIGS. 3-6 are schematic diagrams illustrating exemplary data structures which can be stored in memory 34 and which can be used by processor 32 to perform the segmentation described herein. These data structures are illustrated and/or used by way of example only—e.g., to assist in describing a process of depth-data segmentation, as shown in FIGS. 9-10 (discussed more below). Each of FIGS. 3-6 and aspects thereof are discussed below.

Figure 3:
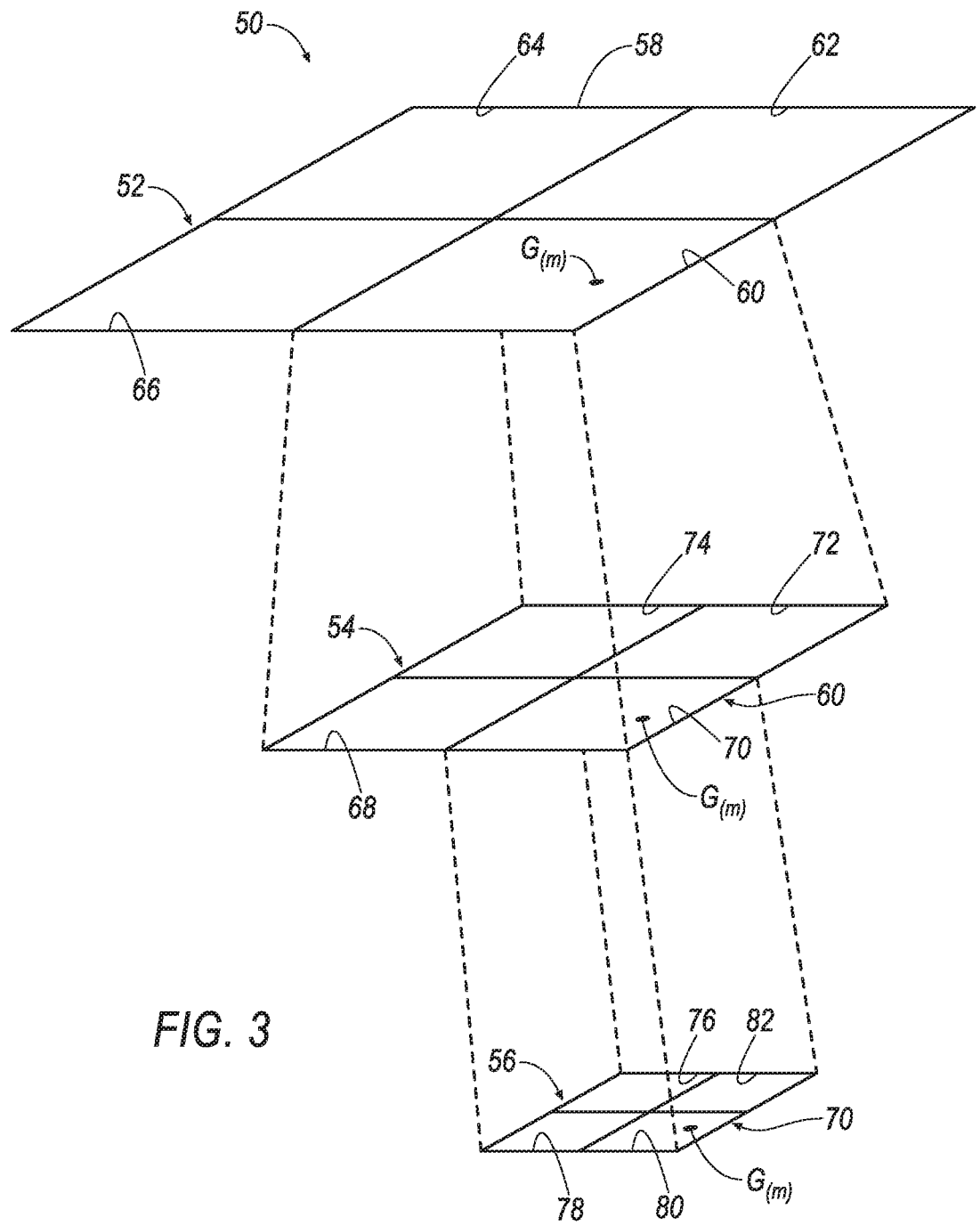
FIG. 3 is a diagram illustrating a grid-tree structure.

FIG. 3 illustrates an exemplary grid-tree data structure 50 comprising multiple levels 52, 54, 56. Of course, while three are shown, any suitable quantity of levels may be used. Each level 52-56 may comprise a plurality of nodes. For example, level 52 comprises a root node 58 and a plurality of child nodes 60, 62, 64, 66 within that root node 58 (e.g., as well as all of the nodes of each of child nodes 60-66). In this example, the grid-tree data structure 50 is a quad-tree data structure; thus, each parent node (e.g., such as root node 58) comprises four child nodes (e.g., in this case, nodes 60-66).

A quad-tree data structure is a data structure in which each internal node has exactly four child nodes. Quad-tree data structures can be considered a two-dimensional analog of an octree or oct-tree data structure. A quad-tree data structure implementation is merely one example; other grid-tree data structure examples may be used instead.

Accordingly, in the illustrated example, in level 54, child node 60 may comprise a plurality of child nodes 68, 70, 72, 74 (e.g., as well as all of the nodes of each of child nodes 68-74). And accordingly, in level 56, child node 70 may comprise a plurality of child nodes 76, 78, 80, 82 (e.g., as well as all of the nodes of each of child nodes 76-82—e.g., here, none are shown). Thus, if the grid-tree data structure 50 were extended further, each child node 76-82 could have a plurality of child nodes as well.

Each node may store one more depth-data packets—e.g., one depth-data packet $G_{(m)}$ is shown for purposes of illustration only; however, it should be appreciated that many depth-data packets are likely to be stored in memory 34. In FIG. 3, depth-data packet $G_{(m)}$ is located in node 58, node 60, node 70, and node 80. Thus, using such a grid-tree data structure, computer 20 may quickly locate depth-data packet $G_{(m)}$ therein, as described below.

According to known grid-tree data structure techniques, each node may store a threshold quantity of data (e.g., a threshold quantity of depth-data packets), and when the quantity of data in the respective node exceeds the quantity, the computer 20 may be programmed to split the node into child nodes. Other aspects of grid-tree data structures, such as other configuration rules and protocols, will be appreciated by skilled artisans.

Where a node in the grid-tree data structure 50 has no child node, it may be referred to herein as a leaf node. Thus, by way of example in FIG. 3, child node 80 may be a leaf node. Also, as used herein, when any node comprises at least one depth-data packet, it is referred to as an occupied node. And as used herein, when any node comprises no depth-data packets (e.g., it is at least not-yet populated), it is referred to as an empty node. In this manner, a currently-evaluated elevation point need only be evaluated with respect to the previously-evaluated elevation points of the occupied nodes (e.g., instead of evaluating all occupied and empty nodes). Thus, using this hybrid vantage-point tree data structure/ grid-tree data structure approach, computer-processing may be more efficient thereby improving a vehicle passenger's driving experience.

According to an object-oriented technique, each depth-data packet $G_{(m)}$ may comprise a parsable key and a set of values, as shown in Example (1) below. Accordingly, computer 20 can issue a put( ) command (e.g., according to known hashcode techniques) to store the depth data of a currently-evaluated elevation point as a depth-data packet in the hash map of the grid-tree data structure 50—e.g., for use in the process described below. Further, computer 20 can execute a get( ) command (e.g., also according to known hashcode techniques) later to retrieve the depth-data packet, as also described below. Here, the coordinate parameters are shown as Cartesian coordinate values; however, this is merely an example.

depth-data packet $G_{(m)}$=(parsable key,x-coordinate value,y-coordinate value,z-coordinate value,segment identifier,feature vector $h_p$( ))     Example (1)

In Example (1) and as discussed above, the parsable key may be a hash value. As used herein, a hash value may be a numerical value (e.g., a decimal, binary, hexadecimal, etc. value) having a fixed length and may be used for purposes of uniquely identifying its respective depth-data packet. According to at least one example, the hash value is a numeric value smaller than the collectively corresponding x- and y-coordinate values and segment identifier—e.g., so that by using the hash value, computer 20 may more quickly parse large amounts of depth data and more quickly identify the desired depth-data packet.

As shown above and in the description that follows, it should be appreciated that data from the LIDAR device 22 may comprise an x-coordinate value, a y-coordinate value, and a z-coordinate value. For purposes of clarity (and not intending to be limiting), the description that follows uses an illustrative example of x- and y-coordinate values and omits discussion of z-coordinate values. However, both two-dimensional and three-dimensional implementations exist.

According to one example, the x- and y-coordinate values refer to a depth position in a field of view of the LIDAR device 22. Accordingly, based on a position and/or orientation of the LIDAR device 22 on vehicle 12 and using known alignment techniques, computer 20 can determine a relative position of the physical objects 40A, 40B, 40C with respect to the vehicle 12.

Figure 4:
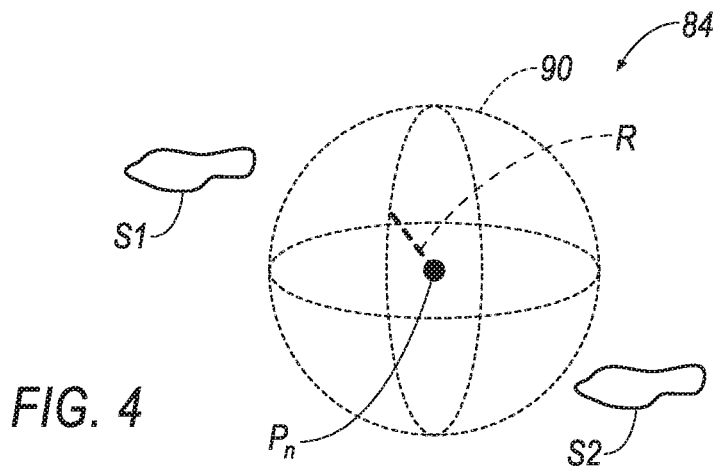
FIGS. 4-6 illustrate different vantage-point tree diagrams.
Figure 5:
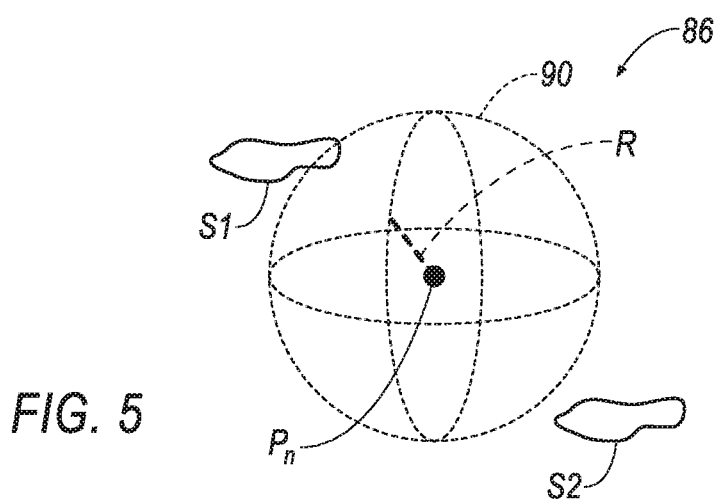
Figure 6:
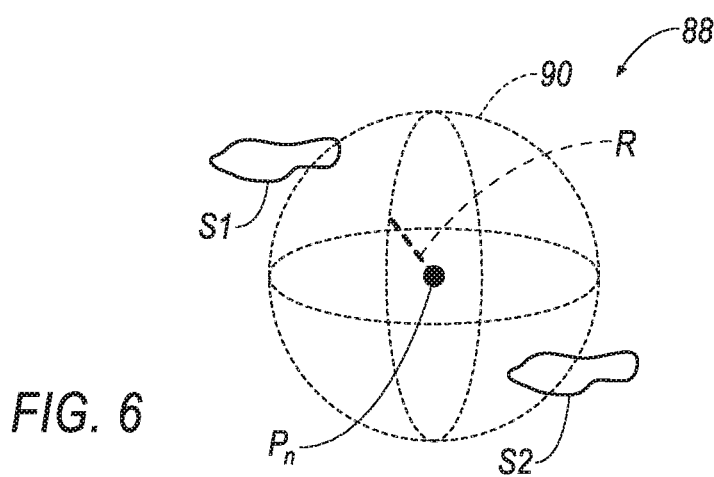

FIGS. 4-6 each illustrate exemplary vantage-point tree data structures 84, 86, 88, respectively. For example, each structure 84, 86, 88 illustrates a currently-evaluated elevation point $P_n$ of a point-cloud data set, two exemplary segments $S_1$, $S_2$, and a radius R extending radially outwardly from point $P_n$ (e.g., accordingly defining a spherical region 90). According to an aggregation process described herein, elevation points $P_n$ are tagged with a segment identifier based on their proximity (e.g., within radius R) to the respective segment.

According to one example, the value of radius R may be predetermined (e.g., stored in memory 34) or may be selectable (or determinable) by computer 20. As larger values of R facilitate more merging and more expeditious merging thereof and as smaller values of R minimize over-segmentation, a trade-off exists. Accordingly, the value of radius R may be determined to balance this trade-off.

According to the example shown in FIG. 4, neither segment $S_1$ or $S_2$ are within radius R—e.g., they are outside the bounds of the spherical region 90. In this example, currently-evaluated elevation point $P_n$ would not be tagged with an existing segment identifier since neither segment $S_1$ nor segment S2 intersect the spherical region 90. As used herein, when a segment is within the radius R (or intersects the spherical region 90) it means that at least one elevation point of the respective segment is within radius R distance of the currently-evaluated elevation point $P_n$. As described below, if no segments were within the radius R, then the currently-evaluated elevation point $P_n$ would be tagged with a new and unique segment identifier (e.g., being the first point associated with that particular segment)—the new and unique segment identifier being generated by computer 20.

According to the example shown in FIG. 5, the currently-evaluated elevation point $P_n$ is within radius R of segment $S_1$, and currently-evaluated elevation point $P_n$ is not within radius R of segment $S_2$—e.g., only segment $S_1$ intersects with the spherical region 90. In this example, currently-evaluated elevation point $P_n$ will be tagged only with an identifier of segment $S_1$.

And according to the example shown in FIG. 6, currently-evaluated elevation point $P_n$ is within radius R of both segments $S_1$ and $S_2$—e.g., both segments $S_1$ and $S_2$ at least partially intersect spherical region 90. In this instance, computer 20 may merge the segments (e.g., segments $S_1$ and $S_2$)—e.g., updating the segment identifier (e.g., to segment $S_{12}$). Further, the currently-evaluated elevation point $P_n$ may be tagged to the updated segment identifier (e.g., to segment $S_{12}$). (Further, in such examples, elevation points previously tagged with segments $S_1$ or $S_2$ may be updated with the new segment identifier as well.)

Figure 7:
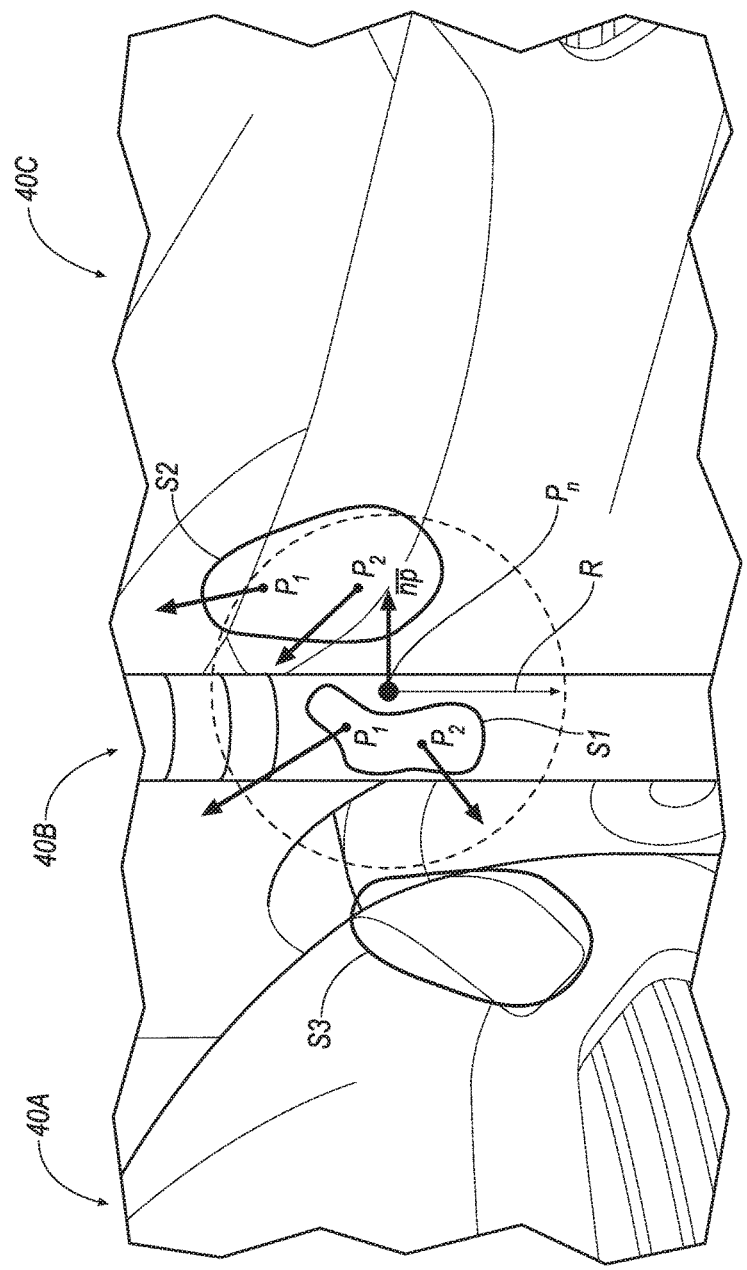
FIG. 7 illustrates a perspective view of an enlarged portion of FIG. 1, as well as LIDAR segments representative of physical objects scanned by the imaging system.

FIG. 7 illustrates a perspective view of an enlarged portion of FIG. 1 including a portion of each of the physical objects 40A, 40B, 40C. FIG. 7 is presented to provide an example of segments $S_1$, $S_2$ both within a radius R of a currently-evaluated point $P_n$ wherein segments $S_1$, $S_2$ correspond with physical objects 40B, 40C, respectively. Thus, based solely on the segmentation radius R, computer 20 may merge these two segments and effectively merge the virtual objects associated with physical objects 40B and 40C, respectively—e.g., now considering them to be a single object, when in fact they are not. This of course would be an example of over-segmentation; other examples include tagging the current elevation point (associated with a first physical object) with a segment identifier (associated with a different physical object). As will be described more below, the feature vector(s) may be used to either: avoid merging segments associated with two different physical objects (e.g., in the first place) or to un-merge segments which should not have been merged.

Turning now to a discussion of how computer 20 receives and uses image data (e.g., from image device 23), as discussed above, computer 20 may determine a feature vector relative to a currently-evaluated elevation point—and include the feature vector as part of the depth-data packet $G_{(m)}$. As illustrated below, the feature vector may be expressed as a matrix having elements which are indexed with i-rows and j-columns (e.g., thus, the elements may be referred to herein as an indexed elements), wherein each element is a feature vector parameter.

According to one example, the feature vector parameters are derived from a surface normal vector $\bar{n}_p$. The surface normal vector $\underline{n}_p$ is a vector whose origin is the currently-evaluated elevation point (e.g., point $P_n$ shown FIG. 7 and which may be located on a virtual surface 96 (FIG. 8)), and the surface normal vector $\underline{n}_p$ extends from this point (e.g., having a magnitude and direction). Accordingly, the origin of surface normal vector $\underline{n}_p$ may be coincident with an intersection of a virtual plane 94 and the virtual surface 96 (e.g., plane 94 being tangent to surface 96 at point $P_n$). Note: when the point $P_n$ is located on a flat virtual surface, plane 94 may coincide with surface 96 (defining a second plane). According to at least one example, surface normal vector $\underline{n}_p$ may be an eigenvector having an eigenvalue of '1,' wherein the vector $\underline{n}_p$ may be represented as shown in Equation (1). In some instances, surface normal vector $\underline{n}_p$ may be determined using depth data associated with point $P_n$ and/or data of nearby previously-evaluated elevation points (not shown in FIG. 8)—e.g., in some instances, computer 20 may calculate the plane 94 using other point-cloud data, which may comprise previously-evaluated elevation points; however, this is not required in all examples. Determination of surface normal vectors is generally known; therefore, techniques for determining the surface normal vector will not be described more herein.

$$\bar{n}_p = [\lambda_1, \lambda_2, \lambda_3] \quad \text{Equation (1)}$$

Figure 8:
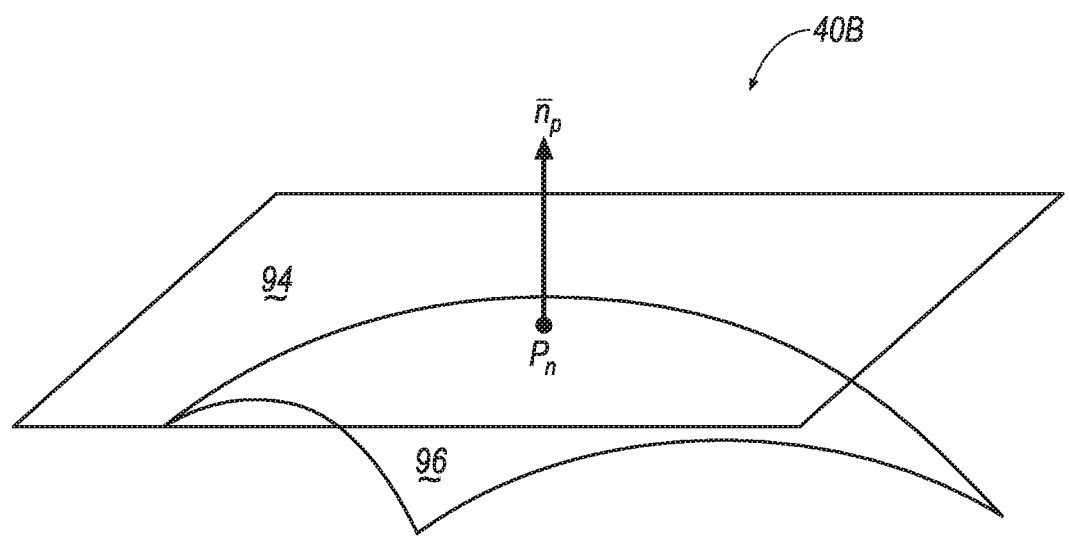
FIG. 8 is an exemplary perspective view illustrating a surface normal vector tangent to an object surface.

By way of example only, FIG. 8 illustrates a virtual surface 96 of post object 40B (shown in FIG. 7) and a tangential plane 94 located relative thereto at point $P_n$. Further, FIGS. 7 and 8 illustrate a surface normal vector $\underline{n}_p$. For purposes of discussion only, vector $\bar{n}_p$ may be [1,0,1]—e.g., wherein $\lambda_1=1$, $\lambda_2=0$, and $\lambda_3=1$.

According to one example, one or more feature vector parameters may be derived from the surface normal vector $\underline{n}_p$. For example, in accordance with Equations (2)-(4), computer 20 may calculate a planarity parameter (Plan), an anisotropy parameter (Anis), and a sphericity parameter (Sph), respectively. As used herein, a planarity parameter refers to a smoothness property of a surface (e.g., surface 96) of a virtual object. For example, when a plurality of planarity parameters (each of a different depth-data packet) are compared, computer 20 may disambiguate one virtual object from another based at least in part on smoothness discontinuities (e.g., of one virtual object versus the other). As used herein, an anisotropy parameter refers to a directionally-dependent property of a surface (e.g., surface 96) of a virtual object. For example, when a plurality of anisotropy parameters (each of a different depth-data packet) are compared, computer 20 may disambiguate one virtual object from another based at least in part on different values of anisotropy parameters measured in one direction versus those measured in a different direction. And as used herein, a sphericity parameter refers to a value indicating how close the virtual object (or segment thereof) approaches a mathematically perfect sphere. For example, differences in sphericity may disambiguate one virtual surface from another (e.g., the sphericity of the virtual surfaces associated with the post object 40B and the vehicle 40C may differ).

$$\text{Planarity parameter Plan} = (\lambda_1 - \lambda_2)/\lambda_1 \quad \text{Equation (2)}$$

$$\text{Anisotropy parameter Anis} = (\lambda_2 - \lambda_3)/\lambda_1 \quad \text{Equation (3)}$$

$$\text{Sphericity parameter Sph} = (\lambda_1 - \lambda_3)/\lambda_1 \quad \text{Equation (4)}$$

Thus, feature vector $h_p(\ )$ may include any one (or combination) of the planarity, anisotropy, and sphericity parameters. According to one example, a feature vector $h_p(\ )$ comprises all three parameters—e.g., a three-dimensional feature vector which may be expressed as $h_p$(Plan, Anis, Sph).

Other feature vector parameters also may be determined and used in combination with one or more of those described above (or used alternatively to those described above). For example, the planarity, anisotropy, and sphericity parameters may be derived from the depth data (from depth-detection device 22); however, some feature vector parameters may be derived from the image data. As discussed above, computer 20 may receive image data having any suitable pixel level resolution. Each pixel may comprise measurement(s)—e.g., such as a red-value, a green-value, and a blue-value, according to a predetermined color resolution (e.g., such as 0-255), according to known techniques. In one example, computer 20 may use the value of the color resolution values as feature vector parameters: a red-value parameter (r), a green-value parameter (g), and a blue-value parameter (b).

Further, in some instances, the image data may comprise an intensity measurement for each pixel. For example, an intensity parameter (i) may be a gain or brightness of a point (that corresponds with a camera pixel) specified in a percentage value, e.g., 0 (zero) % to 100%, wherein a highest intensity value is 100% and a lowest intensity value is 0%. Accordingly, computer 20 may use this value for another feature vector parameter.

As described above, any suitable combination of the feature vector parameters may be used, including other suitable feature vector parameters not illustrated herein. Equations (5)-(7) are merely examples of feature vectors $h_p(\ )$.

$$h_p = (\text{Plan}, \text{Anis}, \text{Sph}) \quad \text{Equation (5)}$$

$$h_p = (i, r, g, b) \quad \text{Equation (6)}$$

$$h_p = (i, r, g, b, \text{Plan}, \text{Anis}, \text{Sph}) \quad \text{Equation (7)}$$

Having described how a feature vector may be determined, it should be appreciated that computer 20 may execute this procedure for evaluated elevation points. Thus, computer 20 may determine multiple depth-data packets which may be categorized and parseable using the vantage-point tree and grid-tree structures described above, wherein each depth-data packet comprises at least one feature vector $h_p(\ )$. In at least one example, the same parameters are evaluated for each feature vector—e.g., computer 20 evaluates each of the elevations points using Equation (5), Equation (6), Equation (7), or the like.

Computer 20 may be programmed to use previously-determined and currently-determined feature vectors to avoid over-segmentation and to determine whether a currently-evaluated point $P_n$ represents a point of a new segment or whether it should be tagged to an existing segment. A disambiguation process is described below wherein the point $P_{n''}$ is evaluated with respect to one existing segment (e.g., segment S1 of FIG. 7); however, it should be appreciated that the process can be executed with respect to multiple segments (e.g., segments S1, S2, etc.), provided the respective segment comprises at least one previously-evaluated elevation point within the predetermined radius R. For example, in the illustration of FIG. 7, segment S1 is shown entirely within radius R, segment S2 is shown partially within radius R, and segment S3 is shown entirely outside of radius R. Thus, in the illustrative disambiguation process described below, each of the previously-evaluated elevation points of segment S1 will be evaluated with respect to point $P_n$ (e.g., because all elevation points of S1 are within radius R), some of the elevation points of segment S2 will be evaluated (i.e., those elevation points within radius R of point $P_n$), and none of the elevation points of segment S3 will be evaluated (i.e., because each of its respective points are outside of radius R).

The disambiguation process includes computer 20 determining one or more correlation vectors $\mu_x$. As used herein, a correlation vector $\mu_x$ is a difference (i.e., a subtraction) between a feature vector of a currently-evaluated point $h_p(\ )$ [associated with a currently-evaluated elevation point $P_n$] and a feature vector of a previously-evaluated point P' [this feature vector referred to herein as $h_{p'(x)}(\ )$], which previously-evaluated elevation point P' is within a predetermined radius R of the currently-evaluated elevation point $P_n$. It should be appreciated that computer 20 may have determined a feature vector $h_{p'(x)}(\ )$, for a respective previously-evaluated point P', in an identical or similar manner as the feature vector determination techniques described above with respect to point $P_n$ and feature vector $h_p(\ )$. Thus Equation (8), shown below, may be repeated x times—for each of a quantity (x) of previously-evaluated points P' of segment S1.

$$\mu_x = h_p(\ ) - h_{p'(x)}(\ ) \quad \text{Equation (8)}$$

Next, for each of the previously-evaluated points P' of the respective segment (e.g., segment S1), computer 20 may calculate a similarity function value $f_x(P_n, P')$ to determine a similarity of point $P_n$ with respect to a previously-evaluated point P' (e.g., point P1, P1, etc. of segment S1). Accordingly, in one example shown in Equation (9), the similarity function value comprises a dot product of the correlation vector $\mu_x$ and a predetermined weight vector which may normalize the correlation vector (e.g., $w^T$ is a transpose of weight vector w).

$$f_x(P_n, P') = w^T \cdot \mu_x \quad \text{Equation (9)}$$

Thus, it should be appreciated that computer 20 may calculate similarity function values for each of x previously-evaluated points P' within radius R (e.g., of the respective segment—e.g., in this instance, all points P' of segment S1).

Next, using the plurality of similarity function values determined using Equation (9), computer 20 may calculate a probability score $P(P_n|S^*)$ using a probability function shown in Equation (10) and compare the probability score to a predetermined threshold (Thr). When the score $P(P_n|S^*)$ is greater than the threshold (Thr), then computer 20 may determine that the point $P_n$ is with the respective segment S* (e.g., continuing with the example: that point $P_n$ should be tagged with an identifier of segment S1).

$$P(P_n|S^*) = \frac{1}{z} \exp\left(-\sum_{P' \in S^*} f_x(P_n, P')\right), \quad \text{Equation (10)}$$

for all x, wherein Z is a normalization value to normalize the probability score between '0' and '1.'

Thus, as described above, if the probability score $P(P_n|S^*)$ is greater than or equal to a threshold (Thr), then point $P_n$ is considered to be within the respective segment S* (e.g., part of segment S1). And if the probability score $P(P_n|S^*)$ is less than the threshold (Thr), then point $P_n$ is considered not to be within the respective segment S* (e.g., it should not be tagged with an identifier of segment S1). Accordingly, the greater the dissimilarity, the lesser the probability of association with the respective segment.

To further illustrate the process, an illustrative calculation example is shown below.

Calculation Example (1)—Segment S1 of FIG. 7.
Begin.
Determine feature vector for currently-evaluated point $P_n$:

$$h_p(\ ) = [30, 235, 113, 200, 1, 0, 1]$$

Using hybrid vantage-point tree and grid-tree structures, recall feature vectors for previously-evaluated points P' (of segment S1):

$$h_{p'(point.P1)}(\ ) = [42, 212, 84, 235, 0.95, 0.04, 1]$$
$$h_{p'(point.P2)}(\ ) = [60, 180, 80, 200, 0.98, 0.02, 1]$$
...
$$h_{p'(x)} = [\_, \_, \_, \_, \_, \_, \_]$$

Using the feature vector of the currently-evaluated point $P_n$, calculate correlation vectors for each feature vector associated with previously-evaluated points P':

$$\mu_{point.P1} = [-15, 23, 29, -35, 0.05, -0.04, 0]$$
$$\mu_{point.P2} = [-30, 55, 33, 0, 0.02, -0.02, 0]$$
...
$$\mu_{(x)} = [\_, \_, \_, \_, \_, \_, \_]$$

Using at transpose of a predetermined weight vector (e.g., wherein weight vector w=[0.05, 0.05, 0.05, 0.05, 0.57, 0.57, 0.57]), determine similarity function values for previously-evaluated points P':

$$f_{point.P1}(P_n, P') = 0.1204$$
$$f_{point.P2}(P_n, P') = 3.3265$$
...
$$f_x(P_n, P') = [\_, \_, \_, \_, \_, \_, \_]$$

Using the similarity function values, determine for the respective segment (e.g., S1) a probability score for all x (e.g., for all previously-evaluated points P' of segment S1):

$$P(P_n|S^*) = \frac{1}{z} \exp\left(-\sum_{P' \in S^*} f_x(P_n, P')\right) = 0.0314$$

Compare the probability score to a predetermined threshold (Thr) (e.g., Thr=0.5):
Since $P(P_n|S1) = 0.0314$, and $0.0314 < \text{Thr}$ (0.5), then computer 20 determines that point $P_n$ is not part of segment S1 (and e.g., if no other segments are evaluated, then a new segment may be created that comprises point $P_n$, as explained more below).
End.

In some examples, as discussed above, currently-evaluated point $P_n$ may be evaluated with respect to other segments having at least one point P' that is at least partially within radius R (e.g., evaluated concurrently or sequentially with respect to segment S1). Thus, while computer 20 may not evaluate any of the points P' of segment S3 because all points associated with segment S3 lie more than radius R away from point $P_n$, computer 20 may evaluate at least some points of segment S2 (i.e., those points (e.g., P1, P2, . . . ) with radius R of point $P_n$). This evaluation may be identical to the process described above; therefore, it will not be repeated here.

Ultimately, if the probability score $P(P_n|S2)$ also is greater than or equal to Thr (0.5), then currently-evaluated point $P_n$ may be tagged with a segment identifier associated segment $S_2$; further, since both probability scores $P(P_n|S1)$ and $P(P_n|S2)$ are greater than or equal to the threshold (Thr), computer 20 may merge the respective segments S1 and S2 together (the resulting tag associating $P_n$ with the merged segment). Alternatively, if the probability score $P(P_n|S2)$ <Thr (0.5), then computer 20 determines that point $P_n$ is not part of segment $S_2$—and similar evaluations may be executed by computer 20 for any other segments having points P' within radius R.

In some circumstances, if no existing segment ultimately has a respective probability score $P(P_n|S^*) \geq$ Thr, then computer 20 may identify a new segment $S_{NEW}$, and tag currently-evaluated point $P_n$ as part of the new segment $S_{NEW}$. Similarly, the depth-data packet associated with point $P_n$ may include, among other things, the identifier for new segment $S_{NEW}$.

Processing

FIG. 9 is a flowchart of a process 900 for disambiguating one virtual object from one or more other virtual objects, wherein each of the virtual objects correspond to physical objects (e.g., such as objects 40A, 40B, 40C in the real world). As described in detail above, computer 20 may store and execute programming instructions embodied as software, represented by the blocks of process 900.

With reference to FIG. 9, process 900 may begin with block 905, in which the computer 20 receives depth-detection data, e.g., from the depth-detection device 22, imaging device 23, or both. Using this information, computer 20 calculates a feature vector $h_p(\ )$ for the currently-evaluated point $P_n$—e.g., such as one of the feature vector examples shown in Equations (5)-(7).

In block 910 which follows, computer 20 determines point(s) P' of one segment (e.g., S1), wherein the points P' are within radius R. Computer 20 may use the hybrid vantage-point tree and grid-tree technique to do this. For example, as described above, using the radius R (e.g., vantage-tree technique) and using the grid-tree hash map, depth-data points within radius R may be quickly located by processor 34.

In block 915, computer 20 may identify the feature vectors $h_{p'(x)}(\ )$ associated with the points P' in the respective segment S. For example, each depth-data packet may comprise x-, y-, and z-coordinate values, a segment identifier (e.g., S1), as well as a stored feature vector $h_{p'(x)}(\ )$.

In block 920 which follows, using the feature vector $h_p(\ )$ determined in block 905, computer 20 may calculate correlation vectors $\mu_x$ that correspond to each of the feature vectors $h_{p'(x)}(\ )$. See, e.g., Equation (8).

In block 925, using the correlation vectors determined in block 920, computer 20 may determine similarity function values. For example, see the dot product evaluation of Equation (9).

In block 930 which follows, computer 20 may use the similarity function values (of block 925) and calculate a probability score $P(P_n|S^*)$ for the respective segment S—e.g., see Equation (10).

In block 935 which follows, computer 20 may determine whether the probability score (of block 930) is greater than or equal to a predetermined threshold (Thr). When the probability score is greater than or equal to the threshold, then process 900 may proceed to block 940, and when the probability score is not greater than or equal to the threshold, then process 900 may proceed to block 945.

In block 940, since the probability score is greater than or equal to the threshold, the computer 20 may tag the point $P_n$ with a segment identifier that corresponds with the currently-evaluated segment (or points P' thereof). For example, being greater than or equal to the threshold (Thr) may mean that the respective feature vector associated with $P_n$ has a relatively high correlation to the feature vectors of the previously-evaluated points P' of the respective segment S. By tagging the currently-evaluated point $P_n$ with an identifier of the currently-evaluated segment, the currently-evaluated point $P_n$ is associated with a virtual object that comprises the respective segment, and over-segmentation is avoided. Thereafter, process 900 may end.

In block 945 which may follow block 935 when the probability score is less than the threshold, computer 20 may determine that the currently-evaluated point $P_n$ is not part of the currently-evaluated segment (e.g., not part of segment S1). Since it is not, computer 20 may determine whether any un-evaluated segments having points P' within radius R remain. When un-evaluated segments remain, then process 900 may proceed to block 950, and when no un-evaluated segments remain, then process 900 may proceed to block 955.

In block 950, computer 20 may select the next un-evaluated segment S having points P' within radius R (e.g., segment S2). Following block 950, process 900 may loop back and repeat blocks 910, 915, . . . (i.e., however, with respect to the next segment). This looping of blocks 910-935, 945, and 950 may occur repeatedly until no un-evaluated segments having points P' within radius R remain.

In block 955, computer 20 may determine that the currently-evaluated point $P_n$ is not part of any segment having points P' within radius R. In this event, computer 20 may generate a new segment (e.g., which at present may comprise only point $P_n$). Computer 20 may generate a new segment identifier $S_{NEW}$ and this information may be stored with a respective depth-data packet associated with the currently-evaluated point $P_n$.

Thereafter, process 900 may end. It should be appreciated that the process 900 was described with respect to a single point ($P_n$); however, it is representative of a process which may be executed for thousands or even millions of points of point-cloud data.

Thus, there has been described a system that comprises a computer, a depth-detection device, and an optional imaging device. Using data from the depth-detection device and/or the imaging device, the computer determines and uses feature vectors to disambiguate one virtual surface from another.

In general, the computing systems and/or devices described may employ any of a number of computer operating systems, including, but by no means limited to, versions and/or varieties of the Ford SYNC® application, AppLink/Smart Device Link middleware, the Microsoft® Automotive operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor may be programmed to process the sensor data. Processing the data may include processing the video feed or other data stream captured by the sensors to determine the roadway lane of the host vehicle and the presence of any target vehicles. As described below, the processor instructs vehicle components to actuate in accordance with the sensor data. The processor may be incorporated into a controller, e.g., an autonomous mode controller.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A method, comprising:
receiving light detection and ranging device data; and
determining that a currently-evaluated point $P_n$ is part of a segment by:
   determining feature vectors for point F and for each of a plurality of previously-evaluated points P' tagged to the segment, wherein the feature vectors comprise a planarity parameter, an anisotropy parameter, a sphericity parameter, or a combination thereof derived from light detection and ranging device data, wherein the planarity, anisotropy, and sphericity parameters are calculated using a surface normal vector having an origin at point $P_n$;
   using the feature vectors, determining a probability score indicative of whether the point $P_n$ is part of the segment; and
   determining that the probability score is greater than a threshold indicating that the point $P_n$ is associated with a virtual object comprising the segment.

2. The method of claim 1, wherein the feature vector for point $P_n$ further comprises at least one of: a red-value parameter, a green-value parameter, a blue-value parameter, or an intensity parameter.

3. The method of claim 1, wherein the points P' are within a predetermined radius of point $P_n$.

4. The method of claim 3, wherein the points P' are stored in memory, and further comprising: looking up the points P' using a grid-tree structure.

5. The method of claim 1, further comprising: prior to determining the score, calculating a correlation vector $\mu_x$ for each of the respective feature vectors of points P' by determining a difference between the feature vector of point $P_n$ [$h_p()$] and the respective feature vectors of points P'[$h_{p'(x)}()$].

6. The method of claim 5, further comprising: calculating a similarity function value $f_x(P_n, P')$ using each of the respective feature vectors associated with points P'[$h_{p'(x)}()$].

7. The method of claim 6, further comprising: calculating the score using an exponential of a negative summation of each of the similarity function values $f_x(P_n, P')$.

8. The method of claim 1, wherein the parameters further are derived using color data, intensity data, or both.

9. A system, comprising:
memory storing instructions; and
a processor executing the instructions to cause the processor to:
receive light detection and ranging device data;
determine feature vectors for a currently-evaluated point $P_n$ and for each of a plurality of previously-evaluated points P' tagged to a segment S1, wherein the feature vectors comprise a planarity parameter, an anisotropy parameter, a sphericity parameter, or a combination thereof derived from a light detection and ranging device data, wherein the planarity, anisotropy, and sphericity parameters are calculated using a surface normal vector having an origin at point $P_n$;
using the feature vectors, determine a probability score indicative of whether the point $P_n$ is part of the segment S1; and
when the probability score is greater than a threshold, tag point $P_n$ to segment S1 to indicate that the point $P_n$ is associated with a virtual object comprising the segment S1.

10. The system of claim 9, wherein the points P' are within a predetermined radius of point $P_n$.

11. The system of claim 10, wherein the points P' are stored in memory, and the instructions further comprising, to: look up the points P' using a grid-tree structure.

12. The system of claim 9, wherein executing the instructions causes the processor to: prior to determining the score, calculate a correlation vector $\mu_x$ for each of the respective feature vectors of points P' by determining a difference between the feature vector of point $P_n$[$h_p()$] and the respective feature vectors of points P'[$h_{p'(x)}()$].

13. The system of claim 12, wherein executing the instructions causes the processor to: calculate a similarity function value $f_x(P_n, P')$ using each of the respective feature vectors associated with points P'[$h_{p'(x)}()$].

14. The system of claim 13, wherein executing the instructions causes the processor to: calculate the score using an exponential of a negative summation of each of the similarity function values $f_x(P_n, P')$.

15. The system of claim 9, wherein executing the instructions causes the processor to:
determine feature vectors for each of a plurality of previously-evaluated points P' tagged to a segment S2;
using the feature vector of point $P_n$ and the feature vectors of previously-evaluated points P' tagged to the segment S2, determine a second probability score; and
when the second probability score is greater than the threshold, tag point F to segment S2.

16. The system of claim 9, wherein the feature vectors comprise feature vector parameters derived from color data, intensity data, a surface normal vector at point $P_n$, or a combination thereof.

17. A system, comprising:
memory storing instructions; and
a processor executing the instructions causes the processor to:
receive light detection and ranging device data;
determine feature vectors for a currently-evaluated point $P_n$ and for all previously-evaluated points P' within a predetermined radius of point $P_n$, wherein the feature vectors comprise a planarity parameter, an anisotropy parameter, a sphericity parameter, or a combination thereof derived from a light detection and ranging device data, wherein the planarity, anisotropy, and sphericity parameters are calculated using a surface normal vector having an origin at point $P_n$;
using the feature vectors, calculate one or more probability scores that are less than a threshold, wherein the one or more probability scores are indicative of whether the point $P_n$ is part of a current segment or a new segment; and
based on the calculation, identify the new segment and tag the point $P_n$ to the new segment, wherein the current segment corresponds to a first virtual object and the new segment corresponds to a second virtual object.

18. The system of claim 9, wherein executing the instructions causes the processor to: operate a vehicle based on the tagging of point $P_n$ to segment S1.

* * * * *